United States Patent [19]
Nishimyo

[11] Patent Number: 5,361,872
[45] Date of Patent: Nov. 8, 1994

[54] CHAIN WHEEL MOUNTING STRUCTURE IN FORKLIFT

[75] Inventor: Teruyuki Nishimyo, Kariya, Japan

[73] Assignee: Kabushiki Kaisha Toyoda Jidoshokki Seisakusho, Kariya, Japan

[21] Appl. No.: 60,637

[22] Filed: May 12, 1993

[30] Foreign Application Priority Data

May 18, 1992 [JP] Japan .................. 4-151605

[51] Int. Cl.⁵ .............................. B66B 9/20
[52] U.S. Cl. ...................... 187/226; 403/334
[58] Field of Search .......... 187/9 R, 9 E, 95;
414/629, 631; 403/333, 334, 362, 259

[56] References Cited

U.S. PATENT DOCUMENTS

| | | | |
|---|---|---|---|
| 2,527,384 | 10/1950 | Abbe | 187/9 E |
| 3,806,214 | 4/1974 | Keiser | 308/190 |
| 4,011,019 | 3/1977 | McDonald et al. | 403/334 |
| 4,227,826 | 10/1980 | Conrad | 403/371 |
| 4,449,614 | 5/1984 | Matsuda | 187/9 R |
| 4,767,230 | 8/1988 | Leas, Jr. | 403/259 |

FOREIGN PATENT DOCUMENTS

| | | |
|---|---|---|
| 1931065 | 7/1971 | Germany . |
| 3017736 | 11/1981 | Germany . |
| 0264590 | 5/1990 | Japan . |
| 835655 | 5/1960 | United Kingdom . |
| 1090568 | 11/1967 | United Kingdom . |

OTHER PUBLICATIONS

Abstract of Japanese Patent Laid-Open Appln. No. 03-232697 pub. Oct. 16, 1991.

*Primary Examiner*—Kenneth W. Noland
*Attorney, Agent, or Firm*—Brooks Haidt Haffner & Delahunty

[57] ABSTRACT

Disclosed is a chain wheel mounting structure adapted to rotatably mount a chain wheel onto a wheel bracket by a support pin. An attaching hole having a taper hole and a threaded hole larger in diameter than and coaxial with the taper hole is formed horizontally on the wheel bracket. Further, the support pin having at one end portion thereof a taper portion corresponding to the taper hole is inserted into the attaching hole so as to protrude a terminal end portion thereof for rotatably fitting the chain wheel, and the support pin is pressed in the axial direction by a stopper bolt threaded into the threaded hole so as to bring the taper portion into close proximity to the taper hole.

6 Claims, 3 Drawing Sheets

CHAIN WHEEL MOUNTING STRUCTURE IN FORKLIFT

BACKGROUND OF THE INVENTION

1. Field of the Invention

The present invention relates to a chain wheel mounting structure in fork lifts and, more particularly, relates to a chain wheel mounting structure improving a front visual field from the driver's seat.

2. Description of the Prior Art

In a conventional fork lift, a two-side supported structure as shown in FIG. 4 or a cantilever structure as shown in FIG. 5 has conventionally been used as the chain wheel mounting structure. In the two-side supported structure of FIG. 4, two pairs of wheel brackets 24a are welded to the lower surface of a chain beam 23 which connects piston rods 22 of left and right lift cylinders 21 to each other, and a support pin 25a for rotatably supporting a chain wheel 26 is fitted horizontally into each pair of wheel brackets 24a in a manner capable of being pulled out therefrom. Such a two-side supported structure is disclosed for example in Japanese Utility Model Laid-Open Application No. 2-64590.

Further, in the cantilever structure shown in FIG. 5, a wheel bracket 24b having a support pin 25b fixed thereto by means of welding or integrally formed thereon is welded to the lower surface of a chain beam 23 which connects piston rods 22 of left and right lift cylinders 21 to each other. A chain wheel 26 is then mounted in a manner rotatable with respect to the support pin 25b. Such a cantilever structure is disclosed for example in Japanese Patent Laid-Open Application No. 62-255395.

In the case of the two-side supported structure, however, a distance L1 from the lift cylinder 21 to the center of a lift chain 27 is larger due to the fact that two wheel brackets 24a are provided in each pair, whereby a chain pitch L2 between the left and right lift chains 27 becomes smaller.

Further, in the case of cantilever structure shown in FIG. 5, the distance L1 from the cylinder 21 to the center of the lift chain 27 must be provided large enough to make possible attachment/detachment of the chain wheel 26 with respect to the support pin 25b. As a result, the chain pitch L2 between the left and right lift chains 27 becomes smaller.

Specifically, in a fork lift of the free lift or semi-free lift having an extent of freedom L for lifting/lowering a load without raising the total height of the mast, there is a restriction that the wheel bracket 24a, 24b must be provided on the lower surface of the chain beam 23. For this reason, in the cases of both two-side supported structure and one-side supported structure as described, the lift chain 27 is present at an inner position distant from the lift cylinder 21 as a member obstructing the visual field. There is thus a problem that the front visual field is narrower comparing to a standard type fork lift in which the lift chain may be positioned relatively close to the lift cylinder by providing a wheel bracket having a support pin facing inward, on the back surface of an inner mast.

It should be noted that, when easiness of pulling out the support pin 25a is considered in the case of the above-described two-side supported structure, loose fitting is required between the support pin 25a formed of a parallel pin and the pin hole on the wheel bracket 24b into which the support pin 25a is inserted. Accordingly, if such loose fit is applied to the one-side supporting structure, the support pin 25a sloped with respect to the pin hole is brought into partial contact with the pin hole, and the stress is concentrated to that portion where breaking may occur. Thus, the one-side supported structure based on fitting method has not been employed for the reason of strength as described.

In view of the above problems, it is an object of the present invention to provide a chain wheel mounting structure of fork lift which is effective in improving the front visual field.

SUMMARY OF THE INVENTION

In order to achieve the above object, a chain wheel mounting structure for rotatably mounting a chain wheel on a wheel bracket by means of a support pin is provided in accordance with the present invention, comprising: an attaching hole horizontally formed on said wheel bracket, having a taper hole tapering toward the terminal end thereof and a threaded hole larger in diameter than and coaxial with the taper hole; said support pin having at one end portion thereof a taper portion corresponding to said taper hole and inserted into said attaching hole so as to protrude the terminal end thereof for rotatably fitting said chain wheel; and a stopper bolt threaded into said threaded hole, for pressing said support pin in the axial direction so as to bring the taper portion thereof in close proximity with said taper hole.

In the chain wheel mounting structure of the present invention, the support pin for rotatably supporting the chain wheel is inserted into the attaching hole of the wheel bracket and it is then assembled with the wheel bracket by threading the stopper bolt into the threaded hole of the attaching hole. At this time, the support pin is fixed in the manner of face-to-face contact at the taper portion thereof with the taper hole because it is pressed in the axial direction by the stopper bolt. Accordingly, a required strength may be secured even though it is of one-side supported structure. Further, after removing the stopper bolt from the threaded hole, the support pin may be removed from the wheel bracket by pulling it out from the attaching hole. This means that it is possible to position the chain wheel close to the lift cylinder whereby the distance from the lift cylinder to the center of the lift chain is reduced.

DESCRIPTION OF THE PREFERRED EMBODIMENT

An embodiment of the present invention will now be specifically described with reference to the drawings.

Figure 2:
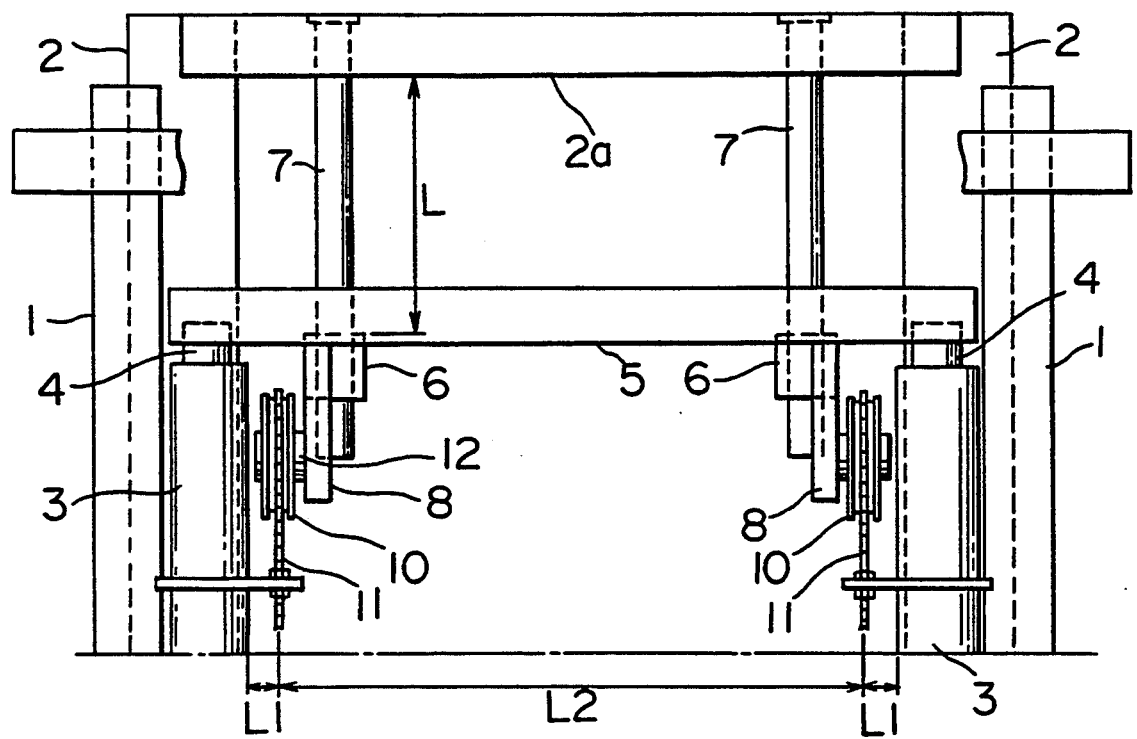
FIG. 2 is a front view as seen from the driver's seat of a mast apparatus of a semi-free lift in the fork lift of FIG. 1.
Figure 3:
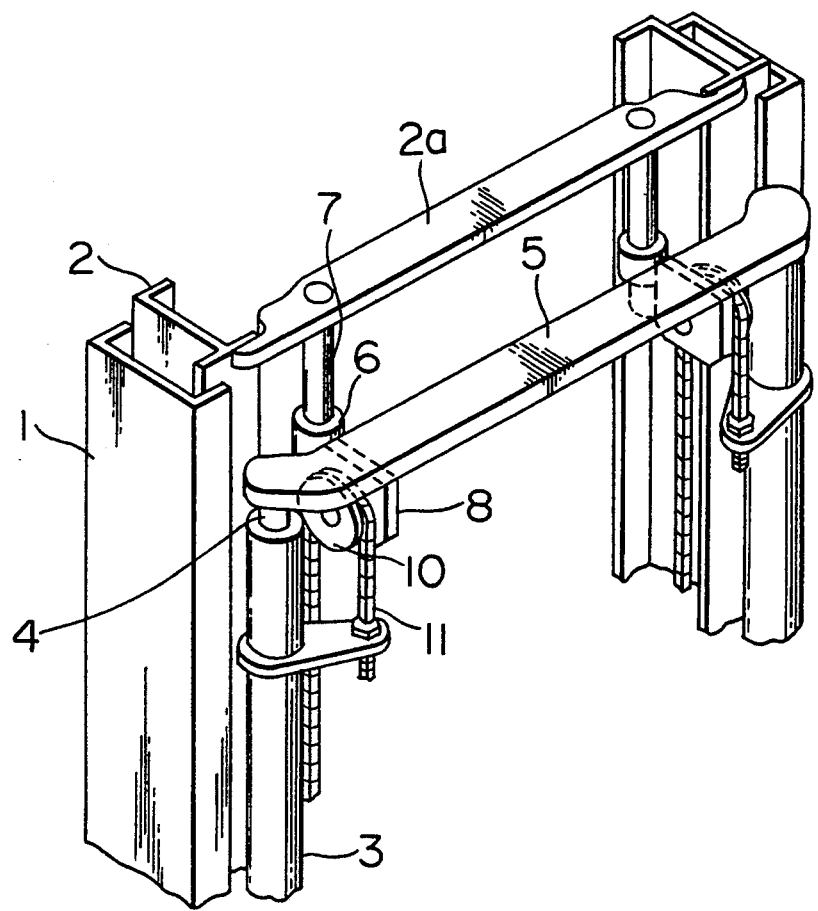
FIG. 3 is a perspective view of the mast apparatus of FIG. 2.
Figure 4:
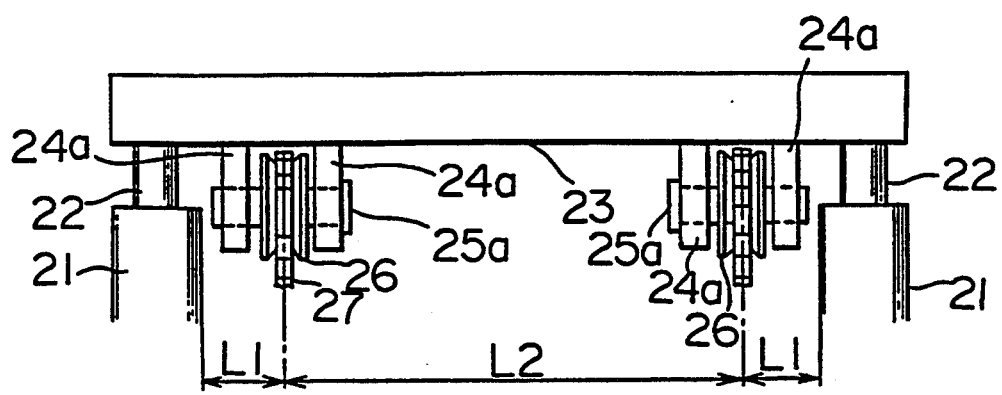
FIG. 4 is a front view as seen from the driver's seat of a chain wheel mounting structure of the conventional two-side supporting system.
Figure 5:
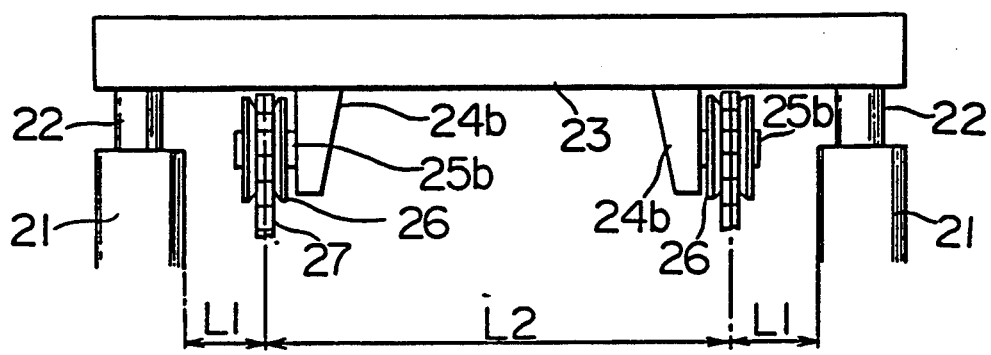
FIG. 5 is a front view as seen from the driver's seat of a chain wheel mounting structure of the conventional one-side supporting system.

The present embodiment is the one applied to a fork lift with semi-free lift, and a mast apparatus of the semi-free lift will be first described with reference to FIGS. 2 and 3. As shown therein, lift cylinders 3 are provided at the rear of a pair of left and right masts, respectively. Specifically, the left and right lift cylinders 3 are raised on a floor beam (not shown) of outer masts 1, and the upper portions of piston rods 4 thereof are connected to each other by a chain beam 5.

A chain wheel 10 is attached by way of a wheel bracket 8 to each of the left and right lower end surfaces of the chain beam 5. Further, a lift chain 11, which is supported by each of these chain wheels 10, is connected to the lift cylinder 3 at one end thereof and is connected at the other end thereof to a lift bracket (not shown) which goes up and down along the inner mast 2.

Guide pipes 6 having their respective axes in the vertical direction are rigidly fixed by means of welding to or integrally formed with the front surface side (deeper into the other side with respect to the plane of FIG. 2) of the left and right brackets 8, respectively. Each guide pipe 6 is positioned in front of the front end surface of the chain beam 5 and has a cylindrical hole into which a guide rod 7 suspended from the lower surface of an upper tie beam 2a of the inner masts 2 is fitted in a slidable manner.

In this manner, a free lift amount L is provided between the lower surface of the upper tie beam 2a and the upper surface of the guide pipe 6. It should be noted that, as shown in FIG. 3, a predetermined shift in position with respect to front and rear direction is provided between the upper tie beam 2a and the chain beam 5 so as to avoid an interference at the time of free lift.

Figure 1:
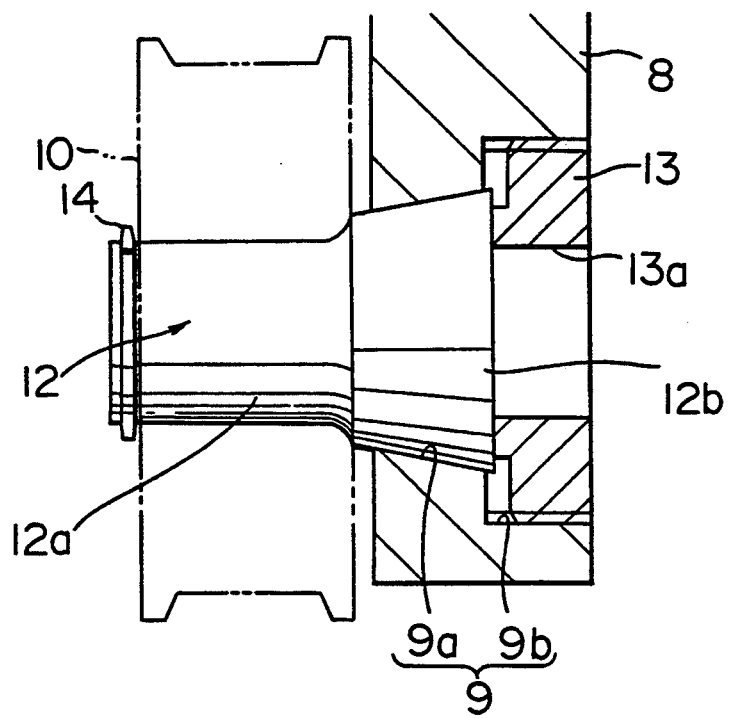
FIG. 1 a is sectional view of a chain wheel mounting structure of fork lift according to an embodiment of the present invention.

The chain wheel mounting structure will now be described in detail with reference to FIG. 1. Each wheel bracket 8 as described is welded at its upper portion to the lower surface of the chain beam 5 to be suspended therefrom and has at its lower side an attaching hole 9 horizontally penetrating therethrough for mounting a support pin 12. The attaching hole 9 is constituted by a taper hole 9a tapering toward one end thereof and a threaded hole 9b larger in diameter than and coaxial with the taper hole 9a, where the taper hole 9a is provided on the outer side, i.e., toward the lift cylinder 3 with respect to both of left and right wheel brackets 8.

The support pin 12 for thus supporting the chain wheel 10 is a stepped pin of which the supporting portion for the chain wheel 10 comprises a parallel portion 12a and the mounting portion for the wheel bracket 8 comprises a taper portion 12b. When fitted in the taper hole 9a of the wheel bracket 8, the support pin 12 is prevented from falling off by a stopper bolt 13 threaded into the threaded hole 9b and having a square hole 13a for inserting a tool.

It should be noted that the chain wheel 10 is fitted in a rotatable manner onto the parallel portion 12a of the support pin 12 and is prevented by a cir-clip 14 or the like from being pulled out.

In the chain wheel mounting structure according to the present embodiment, the support pin 12 is constructed to be supported at one side thereof based on fitting using a taper with respect to the wheel bracket 8. Attaching of the support pin 12 to the wheel bracket 8 is performed such that the support pin 12 is inserted into the attaching hole 9 from the right side as shown in FIG. 1 so that the parallel portion 12a thereof is caused to protrude and the stopper bolt 13 is then threaded into the threaded hole 9b of the attaching hole 9.

Further, the chain wheel 10 is fitted onto the parallel portion 12a of the support pin 12 at the time of insertion of the support pin 12 into the taper hole 9a and then is prevented from falling off by the cir-clip 14.

Thus, the support pin 12 mounted as described receives at its pin end surface a pressing force due to the stopper bolt 13 whereby the taper portion 12b thereof is fixed in a close proximity to the taper hole 9a of the attaching hole 9. In other words, since the support pin 12 is brought into surface-to-surface contact with the wheel bracket 8, a strength equivalent to that in the case of fixing by welding or of monolithic forming may be obtained even though it is of a cantilever structure.

It should be noted that, the stopper bolt 13 after being attached is preferably caulked along the circumference thereof by means of a known method such as screws.

On the other hand, if it is necessary to remove the chain wheel 10, the cir-clip 14 for preventing falling off of the chain wheel 10 is removed from the support pin 12 and on the other hand the stopper bolt 13 is removed from the threaded hole 9b. Then the support pin 12 may be removed by pulling it to the right as shown in FIG. 1 from the taper hole 9a of the wheel bracket 8. It should be noted that, while mounting of the chain wheel 10 on the left side as shown in FIG. 2 has been described with reference to FIG. 1, the direction in mounting of the chain wheel on the right side as shown in FIG. 2 is symmetrical to what has been described above.

As described, according to the present embodiment, it is not necessary to specifically provide a distance for mounting/dismounting of the chain wheel. Thus, the extent of the distance L1 from the lift cylinder 3 to the center of the lift chain 11 is required only to be slightly wider than the width of the chain wheel 10, where it may be much smaller comparing to that in the conventional mounting structure. As a result, it is possible to make wider the chain pitch L2 between the left and right lift chains 11.

It should be noted that, while the present embodiment has been described as applied to a fork lift with semi-free lift, it naturally provides similar effects and advantages also in the case with free lift. In addition, though not resulting in an improvement in the front visual field, it may be applied without any problem to a fork lift based on an ordinary standard specification.

Further, if necessary, it is possible to form the support pin 12 and the stopper bolt 13 together with each other or to provide a square shaft instead of the square hole 13a of the stopper bolt 13.

As has been described in detail, according to the chain wheel mounting structure of the present invention, it is possible to provide a required strength even though it is of a cantilever structure and the lift chain, the member obstructing the front visual field, may be disposed as close as possible to the lift cylinder. Thus, the chain pitch between the left and right lift chains may be widened to achieve an enlargement of the front visual field.

I claim:

1. In a fork lift having a pair of inner masts connected by a beam, said beam having two opposite ends respectively adjacent to each of said pair of masts, a chain wheel mounting structure for rotatably mounting a chain wheel on each of a pair of wheel brackets through a support pin for each chain wheel, said pair of wheel brackets being attached symmetrically to the respective of said two opposite ends of said beam, each said chain wheel mounting structure comprising:

a taper hole formed in said wheel bracket with the smaller diameter side thereof facing said chain wheel;

said support pin having a taper portion shaped as a complement to said taper hole and a chain wheel supporting portion extending from the taper portion and having a smaller diameter relative to the taper portion; and means for bringing the outer peripheral surface of said taper portion of the support pin into pressed contact with the inner peripheral surface of said taper hole when said taper portion of the support pin is inserted into said taper hole so that the chain wheel supporting portion protrudes from said wheel bracket.

2. A chain wheel mounting structure in a fork lift, for rotatably mounting a chain wheel on a wheel bracket through a support pin, said chain wheel mounting structure comprising:

a taper hole formed in said wheel bracket with the smaller diameter side thereof facing said chain wheel;

said support pin having a taper portion shaped as a complement to said taper hole and a chain wheel supporting portion extending from the taper portion and having a smaller diameter relative to the taper portion; and means for bringing the outer peripheral surface of said taper portion of the support pin into pressed contact with the inner peripheral surface of said taper hole when said taper portion of the support pin is inserted into said taper hole so that the chain wheel supporting portion protrudes from said wheel bracket, said means comprising a threaded hole formed coaxially with said taper hole in said wheel bracket, and a stopper bolt threaded into the threaded hole so as to abut against said taper portion of said support pin.

3. A chain wheel mounting structure according to claim 2, wherein said stopper bolt is formed integral with said support pin.

4. A chain wheel mounting structure according to claim 2, wherein said stopper bolt is formed separately from said support pin.

5. A chain wheel mounting structure according to claim 2, wherein the chain wheel supporting portion of said supporting pin is shaped into a circular column and has a member for preventing falling off at an end portion thereof protruding from said chain wheel.

6. In a fork lift including: a pair of outer masts provided vertically with a lateral separation from each other; a pair of inner masts provided in a manner capable of being raised and lowered at the inner sides of said outer masts; an upper tie beam attached to the upper ends of the inner masts so as to connect them to each other; a pair of lift cylinders raised in the vicinity of the respective of said outer masts, each having a piston rod; a chain beam attached to the upper ends of the respective piston rods so as to connect them to each other; a pair of lift chains each attached at one end thereof to each lift cylinder and connected at the other end thereof to a lift bracket raised and lowered along said inner mast; and a pair of chain wheels each attached in the vicinity of one of the end portions of said chain beam through a wheel bracket for guiding the raising and lowering of one of said lift chains, a structure for attaching each said chain wheel to a corresponding one of said wheel brackets, each said structure comprising:

a taper hole formed in said wheel bracket with the smaller diameter side thereof facing said chain wheel;

said support pin having a taper portion shaped as a complement to said taper hole and a chain wheel supporting portion extending from the taper portion with a relatively smaller diameter; and means for bringing the outer peripheral surface of said taper portion of the support pin into pressed contact with the inner peripheral surface of said taper hole when said taper portion of the support pin is inserted into said taper hole so that the chain wheel supporting portion protrudes from said wheel bracket.

* * * * *

UNITED STATES PATENT AND TRADEMARK OFFICE
CERTIFICATE OF CORRECTION

PATENT NO.  : 5,361,872
DATED       : November 8, 1994
INVENTOR(S) : T. Nishimyo It is certified that error appears in the above-indentified patent and that said Letters Patent is hereby corrected as shown below:

Column 6, line 9, "supporting" should read --support--.

Signed and Sealed this

Fourth Day of April, 1995

Attest:

BRUCE LEHMAN

Attesting Officer       Commissioner of Patents and Trademarks